United States Patent [19]

Abram

[11] 4,030,750
[45] June 21, 1977

[54] SISSY BAR FOR A MOTORCYCLE

[76] Inventor: Doug Abram, 7101 - 65th Ave. North, Minneapolis, Minn. 55428

[22] Filed: Feb. 28, 1975

[21] Appl. No.: 553,896

[52] U.S. Cl. .................... 297/375; 297/DIG. 9; 297/383
[51] Int. Cl.² .................... B62J 1/00; B62J 1/28
[58] Field of Search ............ 280/289, 202, 289 R, 280/289 E; 297/243, DIG. 9, 353, 354, 383, 375; D12/119

[56] References Cited

UNITED STATES PATENTS

| | | | |
|---|---|---|---|
| 1,113,833 | 10/1914 | Ruff | 280/289 |
| 2,040,942 | 5/1936 | Katenkamp | 297/383 X |
| 2,724,592 | 11/1955 | Pfaus | 297/383 X |
| 2,928,682 | 3/1960 | Spencer et al. | 297/383 X |
| 3,549,172 | 12/1970 | McBroom | 297/243 |
| 3,822,917 | 7/1974 | George | 297/DIG. 9 X |
| 3,850,353 | 11/1974 | Foulds | 280/289 E |
| 3,853,351 | 10/1974 | Lassiter | 297/DIG. 9 |
| 3,899,209 | 8/1975 | Schulz | 297/383 |

*Primary Examiner*—Kenneth H. Betts
*Attorney, Agent, or Firm*—Dorsey, Windhorst, Hannaford, Whitney & Halladay

[57] ABSTRACT

A new and improved sissy bar for a motorcycle which has a movable portion so that a single rider on the motorcycle can use it as a conventional sissy bar or can position it immediately behind him for use as a backrest. If the rider has a passenger, he can position it for the comfort of the passenger. Preferably the slidable portion of the sissy bar is slidably mounted on a support bar which is attached to the frame of the motorcycle. When used as a backrest, it is slidably positioned relative to the seat to the position that the operator desires, and locked into place. A variation also permits the operator to adjust the tilt for maximum comfort. The device is simply constructed and easy to operate with a minimum of moving parts.

10 Claims, 4 Drawing Figures

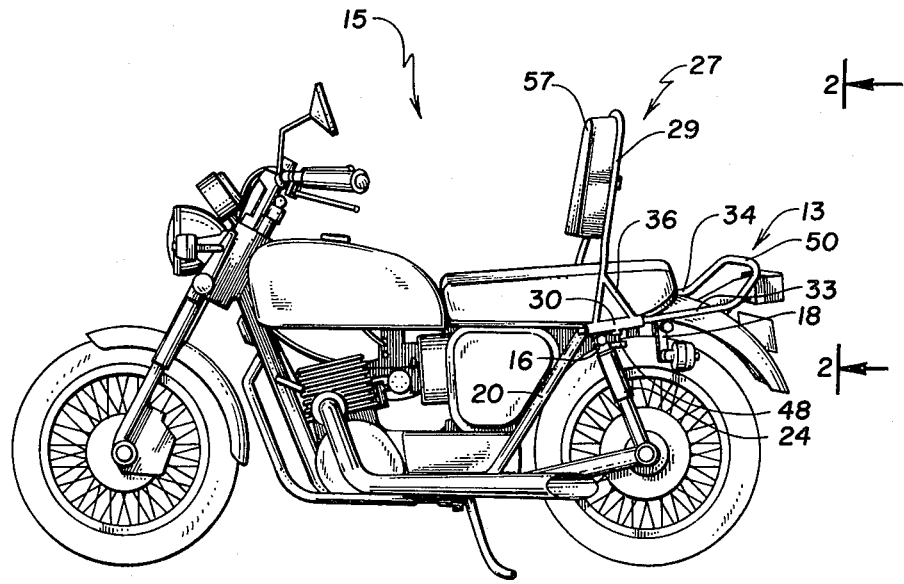
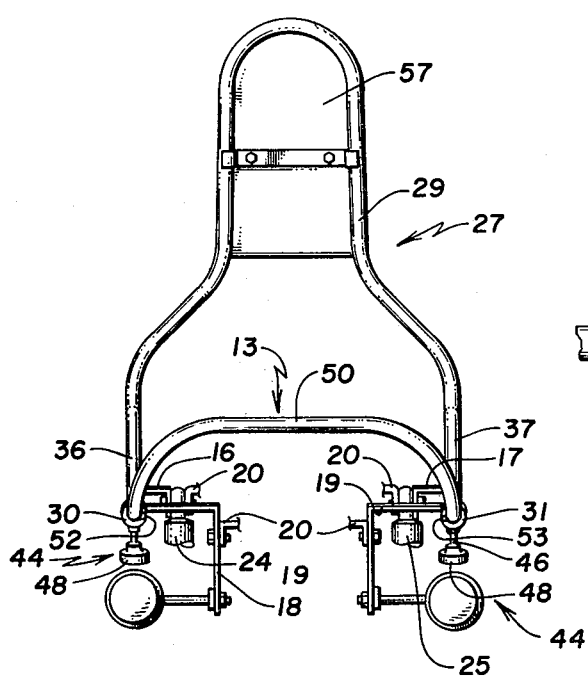
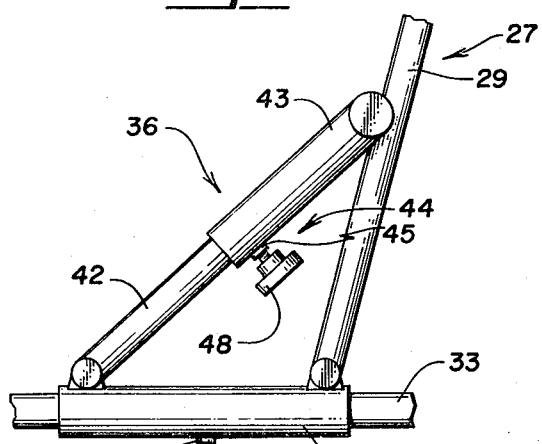
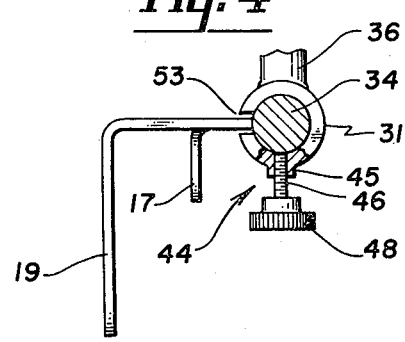

SISSY BAR FOR A MOTORCYCLE

BACKGROUND OF THE INVENTION

A sissy bar for a motorcycle is normally a hairpin shaped extension at the extreme rear portion of a motorcycle which provides no back support for the driver of a motorcycle. It functions to prevent the driver or a passenger from being thrown off the back of the motorcycle during high speed starts and other occurrences. It is understandable that on long motorcycle trips with touring bikes and the like that an operator of a motorcycle will become fatigued because he must hold his body in an upright position. To alleviate this fatigue bicycle and motorcycle backrests have been suggested but if a cyclist utilizes a backrest attached to his seat, it prevents him from carrying a passenger on the bike.

A structure has also been suggested in U.S. Pat. No. 3,549,172 wherein three hinged sections of a seat can be manipulated so that either the middle section provides a backrest for the rider or the last section provides a backrest for a passenger. The structure of that device, however, requires a relatively large number of connecting points, and only allows the rider of the motorcycle to sit on the first third of the seat at all times when riding the bike.

SUMMARY OF THE INVENTION

The present invention is a very simplified structure which is easily and inexpensively manufactured. Basically it consists of a unitary support bar which surrounds the seat of the motorcycle. An upwardly extending sissy bar in the form of a backrest is preferably slidably mounted on the support bar and can be positioned by the operator of the cycle so that it can be used as a conventional sissy bar, or he may use it as a backrest if he chooses, or he can slide it to the rear portion of the support bar so his passenger can use it as a backrest.

A second embodiment of the invention not only provides selective positioning of the backrest anywhere relative to the seat, but also permits the operator to tilt the backrest and incline it to the most comfortable position. The support bar is preferably fastened to the frame of the motorcycle at two different locations and after sliding the backrest into position and locking it into place there is little, if any, possibility of failure of the parts.

BRIEF DESCRIPTION OF THE DRAWINGS

FIG. 1 is a perspective view of the improved sissy bar shown connected to a motorcycle;

FIG. 2 is a perspective back view of the improved sissy bar;

FIG. 3 is a partial side view of my improved sissy bar showing the mechanism for tilting the backrest relative to the seat; and FIG. 4 is a cross section of one of the sliding portions of the backrest showing the locking means.

DESCRIPTION OF THE PREFERRED EMBODIMENT

Referring to FIGS. 1 and 2, a generally U-shaped support bar 13 is fastened to the motorcycle 15 with fastening means 18, 19. Preferably the fastening means 18, 19 take the form of brackets fixedly secured to the support bar 13 as by welding. The support bar 13 is then preferably secured to the motorcycle frame 20 with bolts through the brackets 18, 19. In addition, further support is provided by fastening means 16, 17 taking the form of brackets which are also welded to the support bar 13 and which are bolted with bolts to the frame 20 at the same place the shock absorbers 24, 25 are connected to the motorcycle 15. In this manner at least four separate connections are made to the motorcycle 15 itself to assure safety in operation.

Movably mounted on the support bar 13 is a backrest 27. The backrest 27 preferably consists of an upwardly extending portion 29 and two sliding portions 30, 31, one of each of which slides on each arm 33, 34 of the generally U-shaped support bar 13. In the first embodiment, shown in FIGS. 1 and 2, the upwardly extending portion 29 of the backrest 27 is fixedly secured to one end of each of the sliding portions 30, 31 as by welding. Further bracing members 36, 37 may also be added, extending from the other end of each of the sliding portions 30, 31 to the upwardly extending portion 29 and fixedly secured to each as by welding. This provides additional safety in operation.

As shown in FIG. 3, a second embodiment of the invention further provides means for tilting the backrest 27. In this embodiment each of the bracing elements 36, 37 consists of two telescoping members 42, 43. The operator of the motorcycle 15 can then adjust the tilt of the backrest 27 to its most comfortable position and lock it into place. As shown in FIG. 4, a suitable locking mechanism 44 has been found to be an internally threaded embossment 45 welded onto the outer members 30, 31 or 43. The outer members 30, 31, 43 are then drilled with a hole and a bolt 46, preferably with a suitable handle 48 for ease of operation, can be threaded through the embossment 45 and through the outer members 30, 31, 43 to abut the inner members 33, 34, 42 to lock them into place.

As shown most clearly in FIG. 1, an additional safety feature is provided by curving the rearward portion 50 of the generally U-shaped support bar 13 upwardly in a radius sufficient to contain the sliding members 30, 31. Therefore, if in the unlikely situation that both of the locking means 44 should fail, the sliding portions 30, 31 of the backrest 27 will move no farther than the back of the support bar 13.

Referring to FIGS. 2, 3 and 4, the sliding portions 30, 31 of the backrest 27 preferably consist of a generally cylindrical member with an inner diameter which is greater than the transverse cross section of the support bar 13. Locking means 44 are provided, as described above, which lock each of the sliding portions 30, 31 into place once they have been positioned where the operator desires. To provide full movement of the backrest 27 along the full extent of the support bar 13, longitudinal slits 52, 53 are preferably provided in each sliding portion 30, 31 which are positioned to enable the sliding portion 30, 31 to move past the fastening means 16, 17, 18, 19 as shown in FIGS. 2 and 4. For additional comfort a cushion 57 may be provided on the backrest.

In operation, all that is necessary is to release both of the slide locking means 44 and slide the backrest 27 to the position most comfortable for the operator of the motorcycle 15 or his guest. Thereafter, tightening the slide locking means 44 locks the backrest 27 into the chosen position.

With the alternative embodiment shown in FIG. 3 the operation is equally as simple. All that is necessary is that the operator release both of the tilt locking means 44 and tilt the backrest 27 to the desired position. Thereafter, tightening of the tilt locking means 44 locks it into the desired inclined position.

It should be obvious that my invention is a simple, non-complex sissy bar and backrest which is readily adaptable for use for its intended purpose. It utilizes simple construction in a precise design to assure a minimum of moveable parts, repeated ease of operation and maximum safety to the user.

In general, while I have described specific embodiments of my invention, it is to be understood that these are for purposes of illustration only and that various modifications can be made within the scope of my invention. For example, while the traverse cross-section of the support bar 13 has been shown as circular, it should be obvious that square or hexagonical or ay other shaped stock could be used. Also, various forms of fastening means 16–19, locking means 44 or sectioned sliding means 30, 31 or tilting means 42, 43 could be used and still be within the intendment and teaching of my invention.

Having thus described my invention I claim as my invention the following:

1. A sissy bar for a motorcycle having a seat comprising, in combination:
    a longitudinally movable backrest extending above the seat comprising;
    two sliding portions;
    an upwardly extending portion having two ends at the bottom thereof pivotally attached to each of the sliding portions; and
    means for tilting the backrest comprising two telescoping members pivotally attached to each end of the upwardly extending portion and each of the two sliding portions, respectively, the telescoping members fitting one within the other, and wherein the outer one of each of the telescoping members has means for locking each of the two telescoping members together to prevent relative movement therebetween whereby the upwardly extending portion can be inclined to a desired position and locked into place;
    a support bar having a forward end and a rearward portion surrounding the seat upon the forward end of which the backrest is mounted and wherein the rearward portion of the support bar comprises means for limiting the rearward longitudinal movement of the backrest;
    fastening means fixedly secured to the support bar for attaching the support bar to the motorcycle; and
    locking means for operatively connecting the backrest and the support bar so that the backrest can be longitudinally moved to a desired position relative to the seat and locked into place.

2. A sissy bar for a motorcycle having a seat comprising, in combination:
    a support bar having a transverse cross section and having a forward end and a rearward portion surrounding the seat;
    a longitudinally movable backrest slideably mounted on the forward end of the support bar and extending above the seat comprising;
    two sliding portions each of which comprises a generally cylindrical member having an inner diameter greater than the transverse cross section of the support bar; and
    an upwardly extending portion securely attached to each of the longitudinally movable portions;
    the rearward portion of the support bar comprising means for limiting the rearward longitudinal movement of the backrest;
    fastening means fixedly secured to the support bar for attaching the support bar to the motorcycle; and
    locking means comprising threaded members which extend through the sliding portions of the backrest and contact the support bar when locked into place for operatively connecting the backrest and the support bar so that the backrest can be longitudinally moved to a desired position relative to the seat and locked into place.

3. The sissy bar of claim 2 further comprising means for tilting the backrest relative to the seat.

4. The sissy bar of claim 2 wherein the motorcycly has a frame and wherein fastening means comprises means for attaching the support bar to the frame of the motorcycle.

5. The sissy bar of claim 2 wherein the backrest further comprises a cushion attached to the upwardly extending portion of the backrest.

6. The sissy bar of claim 2 wherein the upwardly extending portion is fixedly secured to each of the two sliding portions.

7. The sissy bar of claim 2 wherein the upwardly extending portion is pivotally attached to each of the sliding portions and further comprising means for tilting the backrest relative to the seat.

8. The sissy bar of claim 2 wherein the support bar is generally U-shaped having a generally curved rearward portion and two horizontal portions as the forward end and wherein the rearward portion is bent upwardly from horizontal with a sufficient radius so that the sliding portions cannot be removed from the rearward portion of the support bar.

9. A sissy bar for a motorcycle having a seat comprising, in combination:
    a support bar having a forward end and a rearward portion surrounding the seat;
    fastening means fixedly secured to the support bar for attaching the support bar to the motorcycle;
    a longitudinally movable backrest slideably mounted on the support bar and extending above the seat comprising;
    two sliding portions having longitudinal slits formed therein positioned relative to the fastening means so that the sliding portions can be moved past the fastening means with the fastening means passing through the longitudinal slits formed in the sliding portion; and
    an upwardly extending portion securely attached to each of the sliding portions;
    the rearward portion of the support bar comprising means for limiting the rearward longitudinal movement of the backrest; and
    locking means for operatively connecting the backrest and the support bar so that the backrest can be longitudinally moved to a desired position relative to the seat and locked into place.

10. The sissy bar of claim 9 further comprising means for tilting the backrest relative to the seat.

* * * * *